Sept. 22, 1959 R. H. POWELL 2,905,387
THERMOSTATICALLY CONTROLLED HOT AND COLD WATER BY-PASS VALVE
Filed Dec. 14, 1956
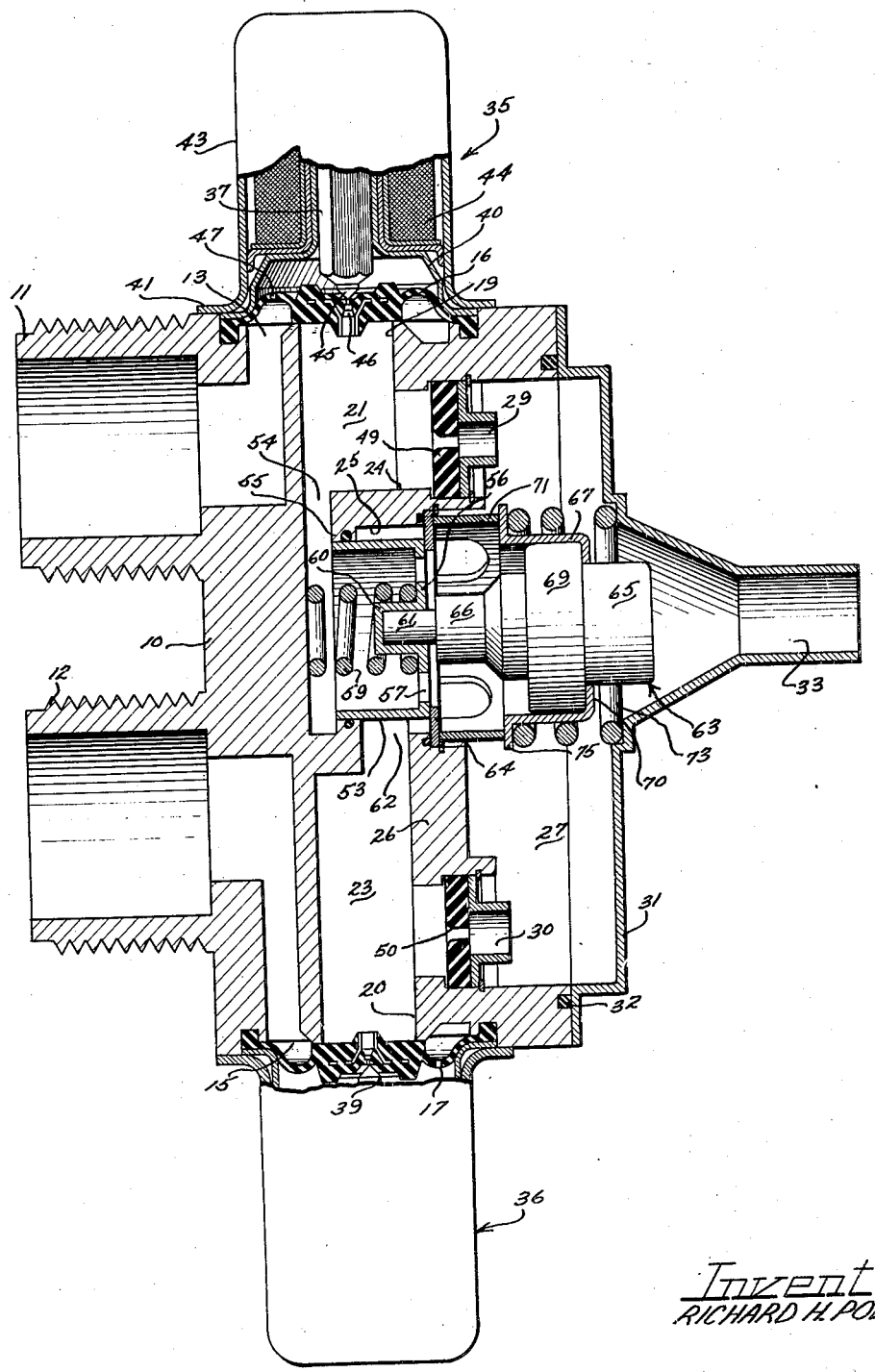
Inventor
RICHARD H. POWELL
By Hill, Sherman, Meroni, Gross & Simpson Attys 2,905,387
Patented Sept. 22, 1959

2,905,387
THERMOSTATICALLY CONTROLLED HOT AND COLD WATER BY-PASS VALVE

Richard H. Powell, Lake Zurich, Ill., assignor to The Dole Valve Company, Chicago, Ill., a corporation of Illinois Application December 14, 1956, Serial No. 628,311

1 Claim. (Cl. 236—12)

This invention relates to improvements in fluid mixing valves of the type adapted to deliver either hot or cold water or a mixture of hot and cold water at an intermediate constant temperature.

The invention has as one of its principal objects to provide a new and improved thermostatically controlled mixing valve in which hot or cold water or water at an intermediate temperature may be attained in a simpler manner than formerly.

Another object of my invention is to provide a simpler form of mixing valve than formerly, in which individual hot and cold water chambers are provided in the valve body having communication with a central mixing chamber through uniform rate of flow control devices, and in which a thermal element is provided in the mixing chamber for metering additional hot or cold water into the mixing chamber as required to attain the desired temperature range of the mixed water.

These and other objects of the invention will appear from time to time as the following specification proceeds and with reference to the accompanying drawing wherein:

The figure shown in the drawing is a transverse sectional view taken through a valve constructed in accordance with the invention showing parts of the solenoid coils for controlling the passage of hot and cold water into the valve body broken away and in section.

In the embodiment of the invention illustrated in the drawing, the valve shown comprises a valve body 10 having hot and cold water inlets 11 and 12, respectively, leading thereinto and having communication with annular passageways 13 and 15, respectively, opening to opposite ends of the valve body.

The annular passageways 13 and 15 are shown as being closed at their open ends by individual diaphragm valves 16 and 17, respectively, controlling the flow of hot and cold water from the respective annular passageways 13 and 15 through ports 19 and 20 having communication with hot and cold water chambers 21 and 23, respectively, within the valve body 10.

The hot and cold water chambers 21 and 23 are separated by a central wall 24 having a generally cylindrical chamber 25 therein, opening through a wall 26 of the valve body into a mixing chamber 27, for tempering hot and cold water entering said mixing chamber through hot and cold water fittings 29 and 30 seated in the wall 26. The mixing chamber 27 is closed by a cover 31, secured to an open wall portion of the valve body, the inner margin of which defines the side walls of the mixing chamber 27. A seal 32 is provided to seal said cover to the valve body.

The cover 31 may be stamped from sheet metal and is shown as having an outlet 33 leading therefrom and formed integrally therewith in alignment with the opening from the cylindrical wall 25 into the mixing chamber 27.

The pressure operated solenoid controlled diaphragm valves 16 and 17 are independently operable to control the flow of hot and cold water into the respective hot and cold water chambers 21 and 23 under the control of solenoids 35 and 36, respectively, in a well known manner.

The diaphragm valves 16 and 17 are controlled by armatures 37 and 39 of the respective solenoids 35 and 36 and are each of a similar construction so the diaphragm valve 16 need only be described herein.

The diaphragm valve 16 is retained in sealing engagement with the open end of the valve body 10 at its periphery by an end cap 40 recessed within the end of the valve body and retained in position therein in engagement with the diaphragm 16, as by an inner flanged portion 41 of a cover 43 for a magnet coil 44 of the solenoid 35. The flange 41 may be retained in abutting engagement with the outer marginal portion of the end cap 40 as by self-tapping screws (not shown) in a usual manner. The end cap 40 forms a guide for the armature 37, which is biased by a spring (not shown) within said end cap to seat a conical end portion 45 of said armature into engagement with a port 46 leading through the center of the diaphragm valve 16. The diaphragm valve 16 has a bleeder passageway 47 leading therethrough to accommodate water to pass from one side of the diaphragm to the other and create a pressure differential on the diaphragm when the orifice 46 is closed by the conical end portion 45 of the armature 37, and thus to maintain the valve closed by the pressure of water acting on the outer side thereof. Upon energization of the solenoid 35, the armature 37 moves out of engagement with the central orifice 46, relieving pressure from the outer side of the diaphragm valve 16 to effect the opening of the valve 16 by the pressure of fluid on the under side thereof. When the diaphragm valve 16 is open, upon energization of the solenoid 35, as previously described, fluid under pressure will flow from the annular passageway 13 through the port 19 to the hot water chamber 21 and to the mixing chamber 27 through the fitting 29 under the control of a uniform rate of flow control device 49.

In a similar manner when the solenoid 36 is energized and the diaphragm valve 17 is open, fluid under pressure will flow from the annular passageway 15 through the port 22 into the cold water chamber 23 and into the mixing chamber 27 through the fitting 30 under the control of a uniform rate of flow control device 50.

The uniform rate of flow control devices 49 and 50 are each of the same construction and are constructed in accordance with the principles of United States Patent No. 2,389,134 which issued to Clyde A. Brown on November 20, 1945, and flex within the respective fittings 29 and 30 upon increases in pressure, resulting in a restriction of the cross-sectional area of the orifices of the flow control devices to adjust the flow through the orifices of the flow control devices in accordance with variations in pressure, and thus to assure a uniform rate of flow of hot and cold water into the mixing chamber 27.

Hot and cold water in the chambers 21 and 23 in addition is metered into the mixing chamber 27 under the control of a generally cylindrical metering valve 53 sealed to an inwardly extending flange portion 55 of the cylindrical wall 25.

The metering valve 53 is shown as being a piston type of valve having an open end portion in communication with the hot water chamber 21 through a port 54 in the wall 24 and having an opposite wall 56 having ports 57 leading therethrough and affording communication through the center of the valve to the mixing chamber 27.

The metering valve 53 is biased into position to admit hot water into the mixing chamber 27 by a compression spring 59 encircling a boss 60 extending inwardly from the wall 56 of the valve piston and forming a seat for a power member 61 of a thermal element 63. The spring 59 also biases the metering valve 53 into engagement with a ring 64 suitably mounted in the wall 26 and forming a seat for the metering valve 53 to meter cold water into the mixing chamber 27 through a port 62 in the wall 25 and the center of the ring 64, upon extensible movement of the power member 61 of the thermal element 63, effected by the heating of a casing 65 of the thermal element by the hot and cold water mixing therearound.

The thermal element 63 is shown as being of the so-called power type of thermal element wherein a fusible thermally expansible material contained within the casing 65 of the thermal element extends the power member or piston 61 from a cylinder 66 of the thermal element as the temperature of the mixed hot and cold water mixing around the casing 65 approaches the range of fusion of the thermally expansible material, as shown and described in Patent No. 2,368,181 which issued to Sergius Vernet on January 30, 1945 and no part of the present invention so not herein shown or described further.

The thermal element 63 is seated in a retainer 67 on a clamping ring 69 of the thermal element, seated against an inner wall 70 of the retainer, through which the casing 65 extends. The retainer 67 is maintained in abutting engagement with a ported sleeve 71 as by an overtravel spring 73 seated in the cover 31 at one end and on a flange 75 of the retainer or cage 67 at its opposite end. The overtravel spring 73 is sufficiently strong to normally act as a solid member, but to yield upon excessive temperature conditions, to prevent damage to the thermal element, the metering valve 53 and the valve body 10.

It may be seen from the foregoing that hot water may be supplied to the mixing chamber 27 and through the outlet 33 at a uniform rate of flow by energizing the hot water solenoid 35 to effect opening of the pressure operated diaphragm valve 16 and that when said valve is open the heat of the hot water flowing around the casing 65 of the thermal element 63 will effect extensible movement of the power member 61 of said thermal element to close the metering valve 53 to the flow of hot water through the ports 57 into the metering chamber 27.

In a like manner, cold water only may be supplied through the outlet 33 upon energization of the cold water solenoid 36 to effect opening of the cold water valve 17. The return spring 57 will then retractibly move the power member 61 of the thermal element 63 and seat the metering valve 53 on the seat 64 to block the flow of cold water into the mixing chamber 27 through the wall 25 and to accommodate the flow of cold water at a uniform rate of flow into the mixing chamber 27 and out the outlet 33 under the control of the uniform rate of flow control device 50.

It may further be seen that upon the energization of the respective hot and cold water solenoids 35 and 36 that hot and cold water will flow into the mixing chamber 27 under the control of the respective flow control devices 49 and 50 and mix around the casing 65 of the thermal element 63 as the mixed water passes through the outlet 33. The thermal element 63 will thus operate to operate the metering valve 53 to add more hot or cold water as required to bring the temperature of the mixed water flowing through the outlet 33 into the desired temperature range.

It will be understood that various modifications and variations of the present invention may be effected without departing from the spirit and scope of the novel concepts thereof.

I claim as my invention:

In a mixing valve for tempering hot and cold water, a valve body having a hollow interior portion therein, a central wall separating said hollow interior portion into separate hot and cold water chambers opening to opposite ends of said valve body, hot and cold water inlets opening into said valve body and having communication with opposite open ends of said valve body, solenoid controlled diaphragm valves closing opposite ends of said valve body and affording communication between said hot and cold water inlets and said respective hot and cold water chambers, a metering chamber in said wall opening to an open side of said valve body, a port from said hot water chamber into said metering chamber, a port from said cold water chamber into said metering chamber, a metering valve slidably guided in said metering chamber for admitting hot and cold water thereinto through said ports, a cover closing the open side of said valve body and having an outlet leading therethrough and forming the open side of said valve body into a mixing chamber for hot and cold water, separate passageways from said hot and cold water chambers into said mixing chamber having uniform rate of flow control devices therein, and a thermal element in said mixing chamber having a casing in association with said outlet and an extensible power member engageable with said metering valve for operating said metering valve to admit hot and cold water into said mixing chamber in addition to that admitted through said uniform rate of flow control devices.

References Cited in the file of this patent

UNITED STATES PATENTS

| 2,528,422 | Chace | Oct. 31, 1950 |
| 2,657,859 | Wangenheim | Nov. 3, 1953 |
| 2,670,900 | Branson | Mar. 2, 1954 |
| 2,708,551 | Record | May 17, 1955 |
| 2,772,833 | Chace | Dec. 4, 1956 |
| 2,837,282 | Budde | June 3, 1958 |